W. H. GASKILL.
MECHANICAL MOVEMENT.
APPLICATION FILED OCT. 15, 1907.
912,108.
Patented Feb. 9, 1909.
2 SHEETS—SHEET 1.
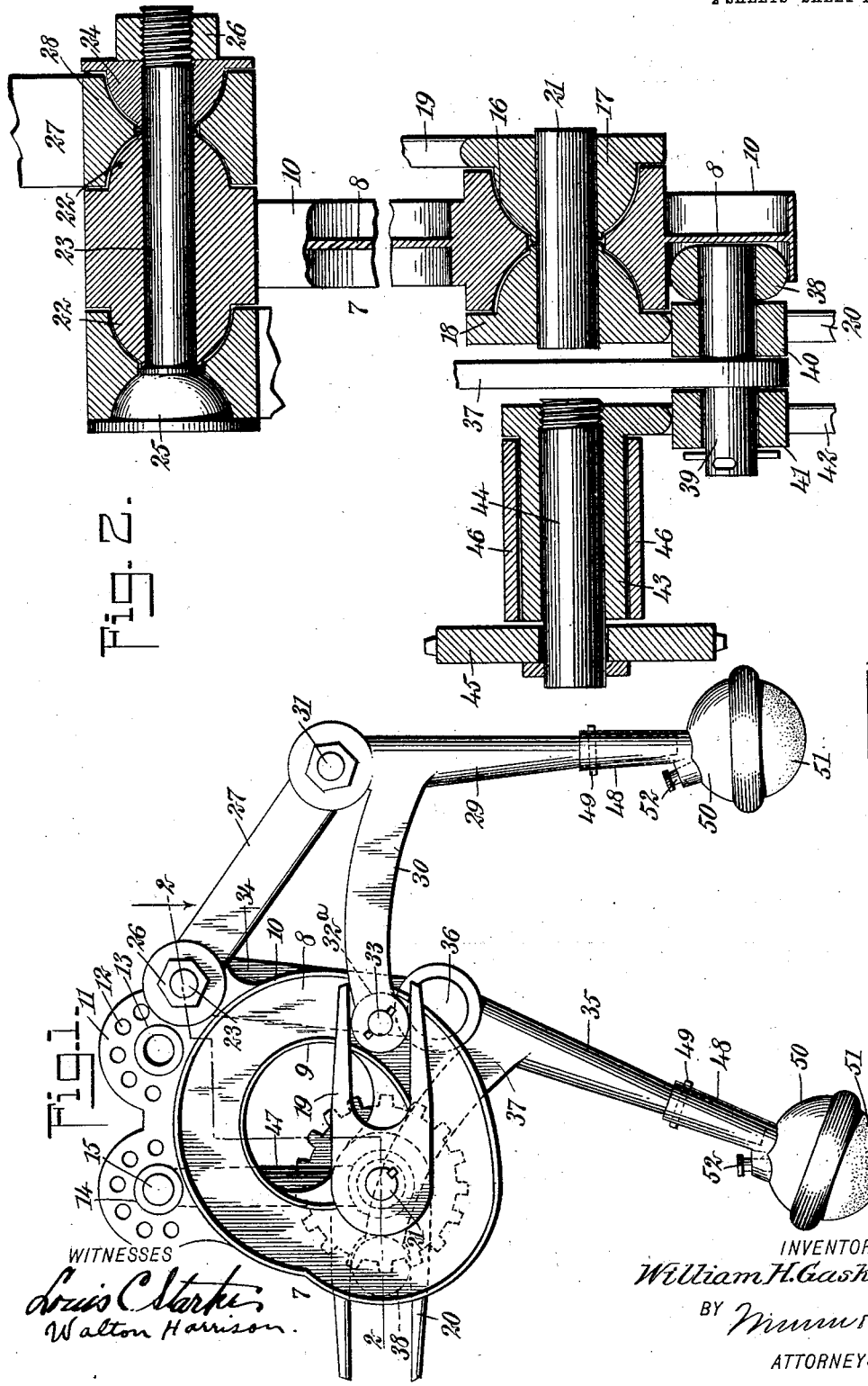
WITNESSES
Louis C. Starke
Walton Harrison
INVENTOR
William H. Gaskill
BY Munn & Co
ATTORNEYS

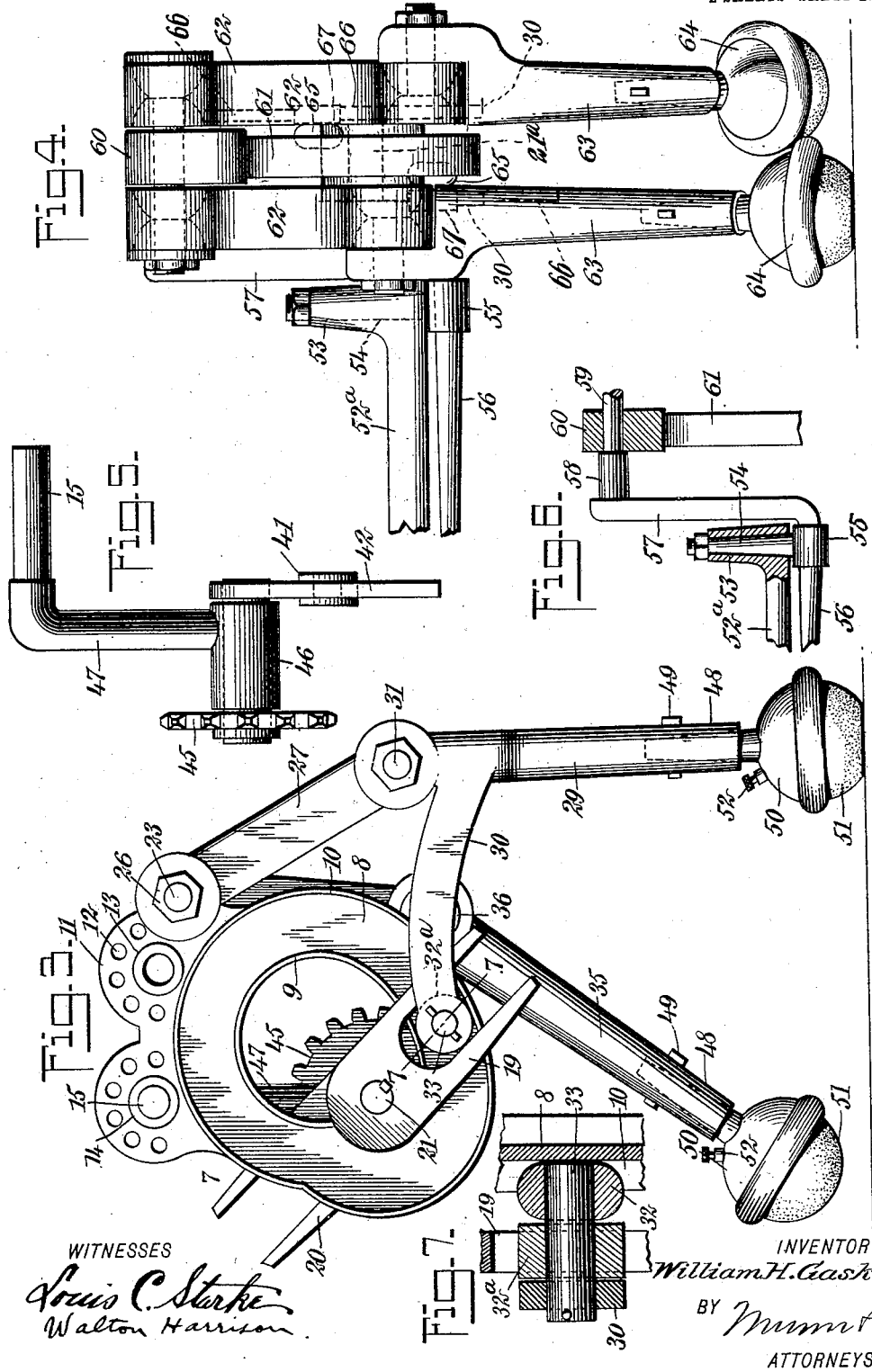

UNITED STATES PATENT OFFICE.

WILLIAM HENRY GASKILL, OF WILSON, NEW YORK.

MECHANICAL MOVEMENT.

No. 912,108. Specification of Letters Patent. Patented Feb. 9, 1909.

Application filed October 15, 1907. Serial No. 397,481.

*To all whom it may concern:*

Be it known that I, WILLIAM H. GASKILL, a citizen of the United States, and a resident of Wilson, in the county of Niagara and State of New York, have invented a new and Improved Mechanical Movement, of which the following is a full, clear, and exact description.

My invention relates to mechanical movements, and more particularly to an automaton mechanical movement suitable for simulating the motions displayed by an animal or a man in walking.

My invention is of peculiar value in relation to propelling vehicles, for steering the same and for use in sporting devices and in toys.

Reference is to be had to the accompanying drawings forming a part of this specification, in which similar characters of reference indicate corresponding parts in all the figures.

Figure 1 is a side elevation of my improved automaton movement, showing the device as provided with legs and feet and with attachments whereby it may be connected with an automobile or other vehicle, this view exhibiting the cam mechanism for moving the legs, gearing and cranks whereby the power is applied; Fig. 2 is an enlarged sectional view upon the line 2—2 of Fig. 1, looking in the direction of the arrow and showing the arrangement of the various crank shafts, cranks, cams, rollers and bearings used in operating the device; Fig. 3 is a side elevation somewhat similar to Fig. 1 but showing the various parts as occupying positions different from those occupied by corresponding parts in Fig. 1; Fig. 4 is a front view of another form of the automaton movement which, in this instance, is adapted for supporting and steering a vehicle, the power being applied independently of the steering movement; Fig. 5 is a detail elevation of the crank and crank hanger used for applying power to the movable parts when the form shown in Figs. 1, 2 and 3 is used; Fig. 6 is a fragmentary elevation, partly broken away, and showing the means for connecting the automaton movement to a vehicle for the purpose of mounting the automaton movement, as shown in Fig. 4, thereupon for use in steering the vehicle; and Fig. 7 is a fragmentary section upon the line 7—7 of Fig. 3, looking in the direction of the arrow and showing a portion of one of the forked cranks through which power is applied to the legs of the automaton movement.

A cam frame 7 comprises a central web 8, an inner flange 9 and an outer flange 10, these parts being made of metal and integral with each other. Connected with the upper portion of the cam frame and integral with the outer flange 10 is a bracket 11 provided with holes 12, the latter being used in securing the bracket, and consequently the cam frame, upon the body of a vehicle.

As the form shown in Figs. 1, 2 and 3 is always used in connection with power applied directly to the moving parts of the automaton movement, the bracket 11 may be clamped rigidly in position relatively to the vehicle body. The form shown in Figs. 1, 2 and 3 may be employed to take the place of one or both of the rear wheels of the vehicle. The bracket 11 is provided with bearings 13, 14. Into the bearing 14 is fitted a neck 15 for the purpose of supporting certain parts hereinafter described. The bearing 13 is to aid in securing the framework to a vehicle body. The cam frame 7 is provided with bearings 16 (see Fig. 2), each concave in form, and fitting into these bearings are journals 17, 18 convex in form and mating the bearings. Each of the journals 17, 18 is substantially of hemispherical conformity and fits into a concavity also substantially hemispherical. Integral with the hemispherical journals 17, 18 are forked cranks 19, 20. The journals 17, 18 are rigidly mounted upon a revoluble stub shaft 21, the center of this shaft thus forming the axis of rotation for the forked cranks 19, 20.

Rigidly connected with the cam frame 7 are two hemispherical journals 22, and passing axially through the latter is a pivot pin 23. The pivot pin 23 is provided with a bushing 24 separate from it but fitting it neatly, as shown in Fig. 2, and is further provided with a hemispherical head 25, the latter being integral with the pin. A nut 26 is threaded internally so as to fit one end of the pin 23, the latter being threaded for the purpose. The bushing 24 and the hemispherical bearing 22 together constitute a mounting for a rod 27 which is provided with a bearing 28 mating the parts 22, 24. A rod 29 (see Fig. 3) is provided with a rearwardly extending arm 30 integral therewith, the rod 29 being journaled to the rod 27 by a pivot 31. The arm 30 carries two rollers 32, 32$^a$, the roller 32 extending intermediate the inner and outer flanges 9, 10, the roller 32ª being partially encompassed by the forked crank 19. These rollers are connected with the arm 30 by a pin 33.

Upon the opposite sides of the device a rod 34 is connected with a rod 35 by a pivot 36, the rod 35 being provided with a rearwardly extending arm 37 carrying rollers 38, 40, the latter being mounted upon a pin 39 fixed rigidly to the arm 37 (see Fig. 2). Mounted also upon the pin 39 is another roller 41. This roller last-mentioned is engaged by a forked crank 42. The crank 42 is mounted rigidly upon a crank hub 43, the latter being secured rigidly upon a revoluble stub shaft 44. A sprocket wheel 45 or analogous gear member, is mounted rigidly upon the stub shaft 44. A hanger 46 supports the crank hub 43 and is provided with a rod 47 extending upwardly therefrom, as will be understood from Figs. 1, 3 and 5. The portion 15 of this rod extends through the bearing 14, as above mentioned, so as to enable the hanger 46 to furnish a firm support for the crank hub 43. The lower ends 48 of the rods 29, 35 are tubular and are provided with pins 49. By aid of these pins the lower ends of the rods 29, 35 support shoes 50 provided with pneumatic cushions 51. Each cushion is provided with a pneumatic valve 52 whereby it may be inflated with air, the degree of pressure varying according to the weight to be supported.

The device shown in Figs. 1, 2 and 3, is used as follows: Being connected upon the rear of a vehicle in place of the wheel, as above described, power is applied to the gear wheel 45. This causes the shaft 44 and crank 42 to revolve. Motion is communicated through the pin 39 to the forked cranks 20, 19 and stub shaft 21. The rollers 32, 38 are thus carried bodily around and because of their guidance by the cam frame, these rollers give erratic movements to the arms 30, 37. The result is that an automaton walking movement is simulated; that is to say, one of the pneumatic shoes is raised from the ground, carried forward, and planted upon the ground, whereupon all of the weight rests upon that shoe, the other shoe being now in the rear. Next the rearmost shoe is raised, carried past the other shoe and planted upon the ground, this movement being repeated continuously.

In the form shown in Figs. 4 and 6, the device is substantially similar to that above described with the exception that certain parts are discarded and the mounting of the automaton is somewhat different. A rigid rod 52ª disposed, we will say, under and across the front end of a vehicle body is provided with a vertical bearing sleeve 53. Extending centrally through this bearing sleeve and movable in relation thereto is a bearing pin 54 provided at its lower end with a sleeve 55 rigidly connected to it. Entering this sleeve is an arm 56 under control of the operator. By manipulating this arm the bearing sleeve 55 and bearing pin 54 may be turned within certain limits to any desired angle. Extending upwardly from the bearing sleeve 55 is an arm 57 (see Fig. 6). A pin 58 is mounted rigidly in the upper end of the arm 57 and is provided with a reduced portion 59.

Mounted upon the pin 58 and depending therefrom is a cam frame 60 provided with a cam 61. With the exception of the mounting for this cam frame it is similar to the one already described. The pin 58 is provided with a reduced portion 59 which extends through the cam frame 60 in the same manner that the neck 15 extends through the bearing 14. Rods 62 are supported by the cam frame and are journaled in position. Pivotally connected to the rod 62 are rods 63 provided at their lower ends with pneumatic shoes 64. Rollers 65 move in erratic paths within the cam frame 60. Forked cranks 66 are secured rigidly upon a revoluble shaft 21ª corresponding to the shaft 21 in Fig. 3. The forked cranks 66 and rollers 67 are analogous to the forked cranks 19 and rollers 32, 40. In other respects the device shown in Fig. 4 is similar to that shown in Figs. 1, 2 and 3.

The operation of the device shown in Fig. 4 is as follows: The vehicle body being propelled by any desired agency independent of the mechanism shown in Fig. 4, the shoes 64 come alternately in contact with the ground. Whenever one of the shoes engages the ground, the forward motion of the vehicle causes motion to be transmitted from that shoe up the rod 63 to the rollers and other moving parts, motion being thus communicated to the forked cranks 66. Owing to the rotation of these cranks motion is transmitted from one side of the device to the other. Whenever one of the shoes is carried backward in contact with the ground, the other shoe is raised and carried forward, this movement being substantially similar to that above described with reference to Figs. 1 and 3, and being a movement which simulates the walking of a human being or an animal. As the limbs 63 thus alternately pass each other, the shaft 21ª turns, owing to the action of the cranks 66 upon it, motion being transmitted to these cranks from the rollers 67. The office of the shaft 21ª and crank 66 is to maintain the limbs 63 in proper position relatively to each other, while these limbs are in motion.

Whenever the operator desires to turn the vehicle, he manipulates the lever 56, thereby causing the cam frame 60 and parts carried by it to turn relatively to the rod 52. This changes the direction in which the automaton walks and consequently turns the vehicle.

The automaton movement above described, taken in connection with the pneumatic shoes, constitutes a type having advantages over those presented by the ordinary wheel support used in vehicles. The automaton steps over obstructions and the friction produced is considerably less than that developing between a wheel and a road bed. Moreover, jolts and other vibrations are greatly diminished. Hence, an automobile using automaton movement of the kind above described will ride easier than one equipped with ordinary means of propulsion and steering.

The device may be used in farm work, taking the place of a horse, to a great extent, being sometimes used in instances where the use of a draft animal is impracticable. The device may also be used at places of amusement and for exhibition purposes.

Having thus described my invention, I claim as new and desire to secure by Letters Patent:

1. A mechanical movement comprising a cam frame, a crank revoluble in relation thereto, a plurality of rods joined together to simulate the leg of a living animal, one of said rods being provided with a portion integral therewith and extending laterally therefrom, a roller mounted upon said portion and engaging said cam frame for the purpose of being guided thereby, a second roller supported by said portion, and a crank disposed adjacent to said cam frame and provided with a surface engaging said second roller.

2. In a mechanical movement, the combination of a cam frame provided with means whereby it may be connected to a vehicle or the like, a plurality of rods journaled together and connected with said cam frame, one of said rods being provided with a rigid arm extending laterally therefrom, a pin carried by this arm and adapted to move in an orbit, a roller mounted upon said pin and engaging said cam frame and adapted to be guided thereby, a second roller mounted upon said pin, and a revoluble crank provided with a forked portion engaging said second-mentioned roller and partially encircling the same.

3. The combination of a cam, a plurality of rods connected together and adapted to simulate limbs to be used in walking, connections from certain of said rods to said cam for enabling said cam to guide the movements of said rods, revoluble cranks for actuating said rods, means for applying power to said revoluble cranks, and pneumatic shoes mounted upon certain of said rods for the purpose of cushioning jolts therein.

In testimony whereof I have signed my name to this specification in the presence of two subscribing witnesses.

WILLIAM HENRY GASKILL.

Witnesses:
A. M. ARMSTRONG,
RAYMOND G. GASKILL.